Sept. 20, 1955     C. RUEBEL ET AL     2,718,578
SPACING AND SCRATCHING DEVICE FOR STUD WELDING
Filed Dec. 22, 1952
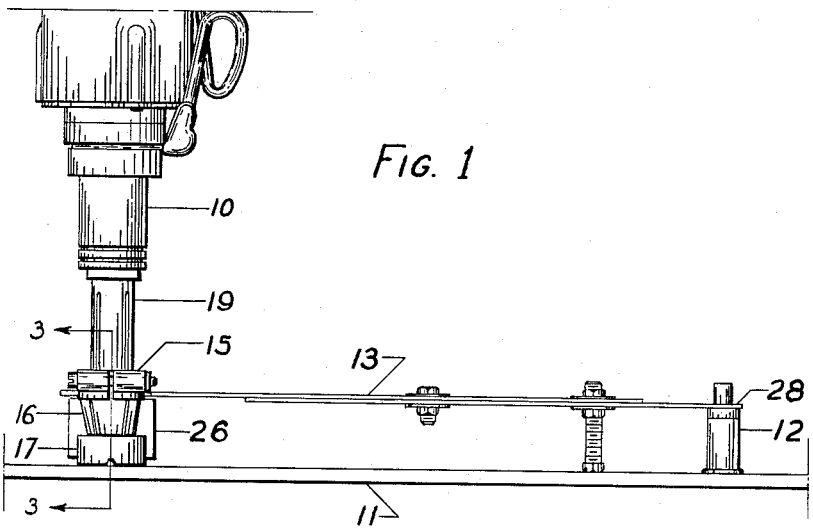
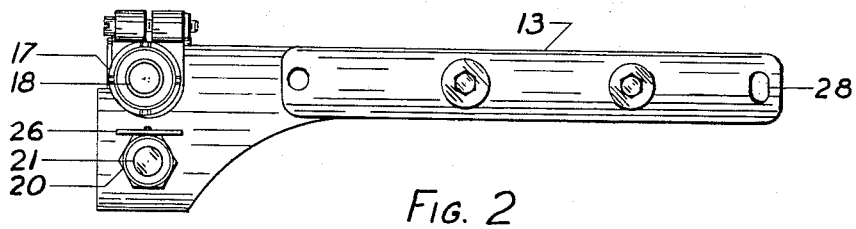
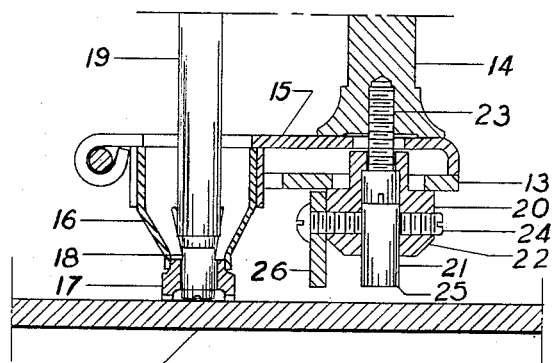
INVENTOR.
Charles Ruebel and
Robert W. Murdock
BY Clyde H. Haynes
their attny.

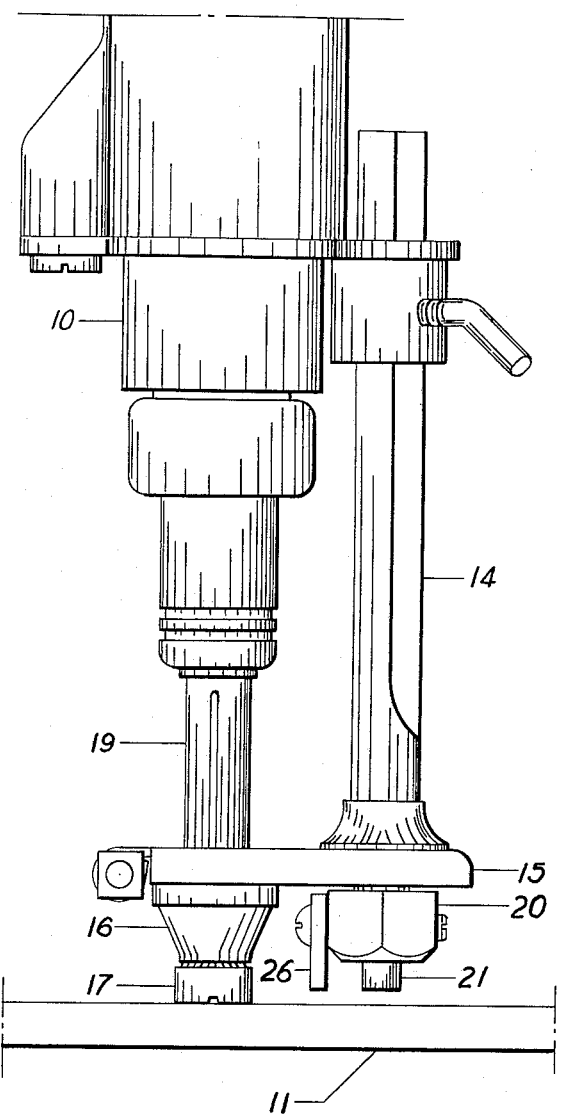
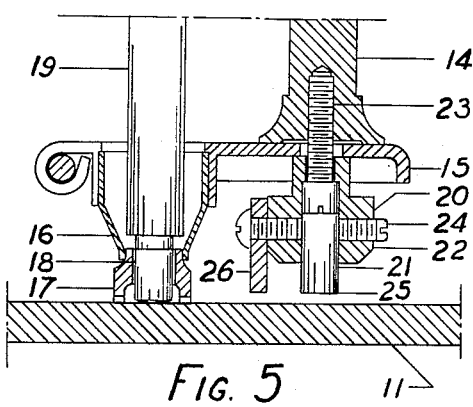

United States Patent Office 2,718,578
Patented Sept. 20, 1955

2,718,578

SPACING AND SCRATCHING DEVICE FOR STUD WELDING

Charles Ruebel, Lorain, and Robert W. Murdock, Bay Village, Ohio, assignors to Gregory Industries, Inc., Detroit, Mich., a corporation of Michigan Application December 22, 1952, Serial No. 327,357

13 Claims. (Cl. 219—4)

This invention relates to stud welding guns provided with an attached scraper and spacing device for uniformly spacing studs on the work, as well as for scratching the site to which the stud is to be welded.

One of the main problems encountered in the field in welding studs to a work piece or member is the elimination of paint, dirt, scale, or other foreign matter so that electrical contact can be made between the stud and the plate. In the past, it has been necessary for a person to lay out the work, determine the location or weld site where the stud will be welded, and scratch or clean that weld site. Generally, all that is needed in cleaning the weld site is a simple scratch with the end of a sharp blade or point. This problem particularly arose in the construction industry wherein purlins and I-beams are very often covered with a heavy lead paint which hinders formation of an arc and good stud welding. The studs are generally spaced apart along these purlins and must be spaced according to the sheets or sheet metal which are fastened to the purlins by the studs. For example, in corrugated siding it is necessary to have the studs spaced according to the crowns or peaks of the corrugations. If the studs are not spaced in this manner, a water-tight joint cannot be obtained or either the corrugated sheet metal has to be bent to conform to the position of the stud, thus resulting in an unsatisfactory structure.

The present invention is designed to provide the stud welding gun with a device for uniformly spacing the studs and also for scratching or cleaning the weld site so that good welds can be obtained. The operator of the gun automatically spaces and cleans each weld site just prior to welding the stud. Thus, it is not necessary to have a special person preceding the welder to clean these spots.

This invention has for one of its objects the provision of a stud welding gun with a spacing bracket to space a stud to be welded at a definite distance from a previously welded stud.

Another object of the invention is to provide the stud welding gun with a scraper for scratching the surface and weld site with the scraper shielded from an arc formed during the welding of a stud.

A still further object of the invention is to provide a stud welding gun with a convenient and easy-to-use scraper which is economical to manufacture and may easily be kept sharpened.

Further features and objects or advantages of the invention are apparent in the following description of the preferred construction and use of the invention taken in conjunction with the accompanying drawings in which:

Fig. 1 is a front elevation view illustrating the welding of a stud at a spaced distance from a previously welded stud.

Fig. 2 is a bottom view of the gun showing the location of the scraper and spacing device.

Fig. 3 is a cross-sectional view along the lines 3—3 of Figure 1.

Fig. 4 is a fragmentary elevational view of a modification of the invention and illustrating the manner in which the scraper is fastened on the gun.

Fig. 5 is a cross-sectional view of the assembly illustrated in Figure 4.

In Figure 1 of the drawings a stud welding gun 10 is positioned to weld a stud to a supporting structure or member 11 at a spaced distance from a previously welded stud 12. The gun 10 and the stud 18 to be welded, which is to be carried by a chuck 19 in the gun 10 is spaced from the previously welded stud 12 by a spacing extension 13, which is mounted on the gun 10 as will be more fully described. Although the gun may be of any suitable design used for end-welding studs to a work plate or to a supporting structure or member, the gun illustrated in the drawings is of the type described in United States Patent No. 2,413,189, issued to T. Nelson on December 24, 1946, and titled "Stud Welding Machines." In this preferred embodiment the scraper and spacing extension are supported by a leg 14 lying wholly to one side of the chuck and attached to the welding gun 10, as illustrated in Figure 4 of the drawing. This structure may be more fully understood by referring to the United States Patent No. 2,416,915, issued to Charles S. Evans, March 4, 1947, entitled "Single Leg Support for Welding Guns."

The leg 14 is provided with a foot 15 which carries ferrule supporting means 16 for supporting a ferrule around the end of the stud 18, which is to be welded to the work plate or member 11 at spaced distance from the previously welded stud 12. The foot plate 15 extends across the axis of the chuck 19 and holds a ferrule in axial alignment with the chuck. The foot 15 is fastened to the end of the leg 14 by the scraper attachment 20, which also holds the spacing extension 13 on the gun 10. The scraper attachment 20 is spaced from the ferrule supporting means 16 a distance regulated by the length of the foot and the distance between the stud 18 held in the chuck 19 and the leg 14.

The scraper attachment 20 includes a sharp-edged scraper member 21 supported in axial alignment with the leg 14 by means of a scraper support member 22 which abuts the spacing extension 13 and has bolt means 23 threaded into the end of the leg 14. A very economical way to make the scraper support member 22 is illustrated in Figure 3 wherein the support member 22 has a countersunk hole receiving the bolt 23, with the head of the bolt 23 engaging an internal shoulder in the support member 22. The sharp-edged scraper 21 has a diameter the same as the head of the bolt and is positioned in this same hole to abut against the head of the bolt 23. A set screw 24 holds the sharp-edged scraper 21 in the scraper support member 22. When the edge of the scraper 21 becomes worn it may be turned slightly and the set screw 24 retightened to position a new part of the circumferential edge 25 in alignment for further scratching of the surface of the supporting structure or member 11 to which the studs are being welded. The scraper member 21 may be of octagonal, square, or other shapes as well as cylindrical; however, a cylindrical shape is most practical.

As was previously disclosed, the sharp edge 25 of the scraper 21 is shielded from weld splatter and the arc used to weld the stud to the member. During the welding of the stud to the member, if weld splatter splashes away from the site of the weld, it may burn the sharp edges of material in the immediate vicinity. This weld splatter is usually close to the melting point of the material in the studs, which usually is steel. The scraper 21 is shielded from the weld splatter and welding arc by a barrier member 26 or a shield fastened to the side of the scraper support member 22 by a screw or other suitable means. As is best illustrated in Figure 2 the shield or barrier member 26 is positioned between the scraper 21 and ferrule supporting means 16 or a stud 18 inserted in the chuck 19 in the gun. The shield or barrier member 26 may be constructed of copper, plastic, or any other suitable material which will prevent the heat of the arc or weld splatter from hitting the scraper 21. As is best illustrated in Figure 3, the ferrule 17 extends out from the foot 15 a definite distance while the scraper 21 and shield 26 extend outwardly from the foot a distance no greater than that definite distance; thus, during welding the ferrule 17 may be seating against the supporting structure or member 11, with a clearance or space between the scraper, the shield and the supporting structure or member. However, the scraper extends out from the foot a distance sufficient so that the edge of the scraper engages the supporting structure or member to which a stud is to be welded by slight tipping of the gun relative to the supporting structure or member.

The spacing extension 13 extends outwardly from the side of the foot 15, substantially perpendicular to a line drawn between the center of the chuck 19 of the gun 10 and the scraper member 21. The spacing extension 13 may be provided with several arms bolted together as illustrated in Figures 1 and 2 so that it is adjustable in length. The free end of the spacing extension 13 is provided with a stud engaging portion 28, adapted to engage a previously welded stud 12, to space the gun the desired and definite distance therefrom. The stud engaging portion 28 is located substantially the same distance from the center of the stud 18 to be welded that it is located from the center of the scraper 21. In actual use the operator welds a first stud which then becomes the previously welded stud 12. After this the gun is reloaded with another stud 18 to be welded to the supporting structure or member 11. The operator then positions the stud engaging portion 28 of the spacing extension on the previously welded stud 12 and draws the gun across the supporting structure or member 11 to scratch any paint, dirt, scale, etc. therefrom, at the new weld site. During this scratching the gun is tipped sufficient so that the edge of the scraper engages the surface of the supporting structure or member and the spacing extension serves as a radius arm pivoted at the previously welded stud. After the line has been scratched at the weld site, the gun is positioned perpendicularly to the surface of the supporting structure or member with the ferrule seated against the surface of member 11 and at the weld site. The welding of the new stud 18 at this weld site is accomplished by pulling a trigger (not shown in the drawings) on the gun as more fully described in the Patent No. 2,413,189.

In the modification as illustrated in Figure 4, the spacing extension has been eliminated. This modification gives us the same standard parts for the scraper attachment 20 as those illustrated for the embodiment for Figure 3. The specific model illustrated in Figure 4 is designed for general use where it is not necessary to space the studs at a specific distance from a previously welded stud or other previously designated point. In this case, the scraper support member 22 abuts directly against the foot 15 and is held there against and on the end of the leg 14 by the bolt 23.

In using the scraper as illustrated in Figures 4 and 5, the operator simply tips the gun and draws the edge of the scraper over the surface of the supporting structure or member at the weld site. After the surface of the supporting structure or member has been scratched by the edge of the scraper, a stud is welded in that scratch line as previously described.

It is understood that other modifications and other specific designs of this invention may be constructed and used without departing from the spirit and scope of the invention and that the herein illustrated design is a specific example only. The spirit and scope of the invention, therefore, is not limited to the specific design and illustrations, but is defined in the following appended claims.

What is claimed is:

1. In a gun for welding a stud within an enclosing ferrule, a chuck for carrying a stud to be welded, a leg lying wholly to one side of the stud carrying chuck, a foot plate on the leg and extending across the axis of the chuck for holding a ferrule, scraper support means seated against said foot, a sharp edged scraper member co-axially aligned with the single leg, said support means having a hole and a set screw holding one end of the scraper member in said hole.

2. In a gun for welding a stud within an enclosing ferrule, a chuck for carrying a stud to be welded, a leg lying wholly to one side of the stud carrying chuck, a foot plate on the leg and extending across the axis of the chuck for holding a ferrule, a sharp-edged scraper member co-axially aligned with the single leg, and means securing said foot and said scraper member onto said leg, said foot having a spacing extension, provided with an end portion engageable with a previously welded stud to space the stud carrying chuck a fixed distance therefrom, said end portion of said spacing extension being spaced substantially equidistant from said scraper member and the chuck axis whereby arc type movement of the scraper member and a stud carried by the chuck around a previously welded stud are in substantially the same path of movement.

3. In a gun for welding a stud within an enclosing ferrule, a chuck for carrying a stud to be welded, a leg lying wholly to one side of the stud carrying chuck, a foot plate on the leg and extending across the axis of the chuck for holding a ferrule of definite dimensions with the ferrule extending out from the foot a definite distance, scraper support means seated against said foot, a sharp edged scraper member co-axially aligned with the leg, said support means having a hole and a set screw holding one end of said scraper member in said hole, a barrier member mounted on said support means and positioned between the scraper member and a ferrule supported by said foot to prevent weld splatter hitting said scraper member, said barrier member and said scraper member extending outwardly from the foot a distance no greater than said definite distance.

4. In a gun for welding a stud within an enclosing ferrule, a chuck for carrying a stud to be welded, a leg lying wholly to one side of the stud carrying chuck, a foot plate on the leg and extending across the axis of the chuck for holding a ferrule of definite dimensions with the ferrule extending out from the foot a definite distance, a sharp-edged scraper member co-axially aligned with the leg, a barrier member between the scraper member and a ferrule supported by said foot to prevent weld splatter hitting said scraper member, said barrier member and said scraper member extending outwardly from the foot a distance no greater than said definite distance, and means securing said foot, said scraper member and said barrier member onto said leg, said foot having a spacing extension provided with an end portion engageable with a previously welded stud to space the stud carrying chuck a fixed distance therefrom, said end portion of said spacing extension being spaced substantially equidistant from said scraper member and the chuck axis whereby arc type movement of the scraper member and a stud carried by the chuck around a previously welded stud are in substantially the same path of movement.

5. The structure set forth in claim 1 including a spacing extension on said foot plate provided with a previously welded stud engageable portion spaced substantially equidistant from said scraper member and the chuck axis whereby arc type movement of the scraper and a stud carried by the chuck around a previously welded stud are in substantially the same path of movement.

6. The structure set forth in claim 3 including a spacing extension on said foot plate provided with a previously welded stud engageable portion spaced substantially equidistant from said scraper member and the chuck axis whereby arc type movement of the scraper and a stud carried by the chuck around a previously welded stud are in substantially the same path of movement.

7. In a gun for welding a stud within an enclosing ferrule, a chuck for carrying a stud to be welded, a leg lying wholly to one side of the stud carrying chuck, a foot plate extending across the axis of the chuck for holding a ferrule, a sharp edged scraper member, and means securing said foot and said scraper member onto said leg, said foot having a spacing extension provided with an end portion engageable with a previously welded stud to space the stud carrying chuck a fixed distance therefrom, said end portion of said spacing extension being spaced substantially an equal distance from said scraper member and the chuck axis whereby arc type movement of the scraper and a stud carried by the chuck around a previously welded stud are in substantially the same path of movement.

8. In a gun for welding a stud within an enclosing ferrule, a chuck for carrying a stud to be welded, a leg lying wholly to one side of the stud carrying chuck, a ferrule support for holding a ferrule in alignment with the chuck, a spacing extension provided with an end portion engageable with a previously welded stud to space the chuck a fixed distance therefrom, means connecting said ferrule support and said spacing extension to said leg, and a scraper member positioned on the spacing extension substantially the same distance from the end portion thereof that the end portion is spaced from a stud carried by the chuck whereby the arc type movement of the scraper and a stud carried by the chuck around the previously welded stud are in substantially the same path of movement.

9. In a stud welding gun for welding a stud within an enclosing ferrule and at a definite distance from a previously welded stud, the provision of a chuck for carrying a stud to be welded, a ferrule supporting member, a scraper member, a spacing extension member, and leg means lying wholly to one side of the stud carrying chuck and maintaining the said members in operative alignment with the chuck, said spacing extension member terminating in a previously welded stud engageable portion spaced substantially an equal distance from the scraper member and the chuck axis, whereby arc type movement of the scraper and a stud carried by the chuck around a previously welded stud are in substantially the same path of movement.

10. In a gun for welding a stud within an enclosing ferrule, a chuck for carrying a stud to be welded, a leg on said gun at one side of said stud carrying chuck, a foot plate on said leg having means thereon for holding a ferrule in axial alignment with said chuck, said leg also supporting scraper support means, and a sharp edged scraper member mounted on said scraper support means, said support means having a hole therein and a set screw for holding one end of the scraper member in said hole.

11. In a stud welding gun for welding a stud at a definite distance from a previously welded stud, the provision of a chuck for carrying a stud to be welded, a scraper member, a spacing extension member, and leg means lying wholly to one side of the stud carrying chuck and maintaining the said members in operative alignment with the chuck, said spacing extension member terminating in a previously welded stud engageable portion spaced substantially equal distances from the scraper member and the chuck axis, whereby arc type movement of the scraper and a stud carried by the chuck around a previously welded stud are in substantially the same path of movement.

12. In a stud welding gun for welding a stud at a definite distance from a previously welded stud, the combination of a chuck on said gun for carrying a stud to be welded, a scraper member, a spacing extension member, a support on said gun laterally adjacent said stud carrying chuck, said support maintaining said scraper member and said spacing extension member in operative alignment with said chuck, said spacing extension member having a portion engageable with a previously welded stud, said stud engaging portion of said extension member being spaced laterally of and substantially equally from said scraper member and the axis of said chuck, whereby when said stud engaging portion of said spacing extension member is engaged with a previously welded stud, arc type movement of said gun about said previously welded stud as an axis causes the stud carried by the chuck and said scraper to move in substantially the same arcuate path.

13. In a gun for welding a stud within an enclosing ferrule, a chuck for carrying a stud to be welded, a leg on said gun at one side of said stud carrying chuck, a foot plate on said leg having means thereon for holding a ferrule in axial alignment with said chuck, said leg also supporting scraper support means, and a sharp edged scraper member mounted on said scraper support means, said support means and said scraper member having cooperating means holding one end of the scraper member in said support means.

References Cited in the file of this patent
UNITED STATES PATENTS

| | | |
|---|---|---|
| 2,159,059 | Trainer et al. | May 23, 1939 |
| 2,416,915 | Evans | Mar. 4, 1947 |